United States Patent
Schmid et al.

(10) Patent No.: US 10,878,583 B2
(45) Date of Patent: Dec. 29, 2020

(54) DETERMINING STRUCTURE AND MOTION IN IMAGES USING NEURAL NETWORKS

(71) Applicant: Google LLC, Mountain View, CA (US)

(72) Inventors: Cordelia Luise Schmid, Saint Ismier (FR); Sudheendra Vijayanarasimhan, Los Angeles, CA (US); Susanna Maria Ricco, Redwood City, CA (US); Bryan Andrew Seybold, San Francisco, CA (US); Rahul Sukthankar, Orlando, CA (US); Aikaterini Fragkiadaki, Pittsburg, PA (US)

(73) Assignee: Google LLC, Mountain View, CA (US)

( * ) Notice: Subject to any disclaimer, the term of this patent is extended or adjusted under 35 U.S.C. 154(b) by 37 days.

(21) Appl. No.: 16/464,608

(22) PCT Filed: Dec. 1, 2017

(86) PCT No.: PCT/US2017/064269
§ 371 (c)(1),
(2) Date: May 28, 2019

(87) PCT Pub. No.: WO2018/102717
PCT Pub. Date: Jun. 7, 2018

(65) Prior Publication Data
US 2020/0349722 A1  Nov. 5, 2020

Related U.S. Application Data

(60) Provisional application No. 62/429,637, filed on Dec. 2, 2016.

(51) Int. Cl.
*G06T 7/269* (2017.01)
*G06T 7/215* (2017.01)
(Continued)

(52) U.S. Cl.
CPC .......... *G06T 7/269* (2017.01); *G06N 3/0454* (2013.01); *G06N 3/0481* (2013.01); *G06T 7/215* (2017.01);
(Continued)

(58) Field of Classification Search
USPC ................................ 382/103, 107, 155–156
See application file for complete search history.

(56) References Cited

U.S. PATENT DOCUMENTS 10,586,433 B2 * 3/2020 Stewart ............ G08B 13/19606
2017/0314930 A1 * 11/2017 Monterroza ......... G06N 3/0454
(Continued)

OTHER PUBLICATIONS

Akhter et al, "Non-rigid structure from motion in trajectory space" NIPS, 2008, 8 pages.
(Continued)

*Primary Examiner* — Ishrat I Sherali
(74) *Attorney, Agent, or Firm* — Fish & Richardson P.C.

(57) ABSTRACT

A system comprising an encoder neural network, a scene structure decoder neural network, and a motion decoder neural network. The encoder neural network is configured to: receive a first image and a second image; and process the first image and the second image to generate an encoded representation of the first image and the second image. The scene structure decoder neural network is configured to process the encoded representation to generate a structure output characterizing a structure of a scene depicted in the first image. The motion decoder neural network configured to process the encoded representation to generate a motion output characterizing motion between the first image and the second image.

22 Claims, 5 Drawing Sheets

(51) Int. Cl.
*G06T 7/70* (2017.01)
*G06N 3/04* (2006.01)

(52) U.S. Cl.
CPC ...... *G06T 7/70* (2017.01); *G06T 2207/10028* (2013.01); *G06T 2207/20081* (2013.01); *G06T 2207/20084* (2013.01)

(56) References Cited

U.S. PATENT DOCUMENTS

| | | | | |
|---|---|---|---|---|
| 2018/0189556 | A1* | 7/2018 | Shamir | G06T 7/269 |
| 2019/0057509 | A1* | 2/2019 | Lv | G06K 9/6256 |
| 2019/0095716 | A1* | 3/2019 | Shrestha | G08B 21/187 |
| 2019/0188863 | A1* | 6/2019 | Ray | G06N 20/00 |
| 2019/0327475 | A1* | 10/2019 | Takeda | G06T 7/143 |
| 2020/0084427 | A1* | 3/2020 | Sun | H04N 13/128 |
| 2020/0193609 | A1* | 6/2020 | Dharur | G06N 3/0472 |
| 2020/0211206 | A1* | 7/2020 | Wang | G06T 7/254 |
| 2020/0250837 | A1* | 8/2020 | Fagg | G06T 7/248 |
| 2020/0258249 | A1* | 8/2020 | Angelova | G06T 7/579 |

OTHER PUBLICATIONS

Bergen et al, "Hierarchical model-based motion estimation" ECCV, 1992, 16 pages.
Black et al, "Learning parameterized models of image motion" CVPR, 1997, 7 pages.
Brox et al, "Object segmentation by long term analysis of point trajectories" ECCV, 2010, 14 pages.
Butler et al, "A naturalistic open source movie for optical flow evaluation" ECCV, 2012, 15 pages.
Byravan et al, "SE3-Nets: Learning rigid body motion using deep neural network" CoRR, 2016, 8 pages.
Chang et al, "ShapeNet: An Information-Rich 3D Model Repository" arXiv, Dec. 2015, 11 pages.
Costeira et al, "A multi-body factorization method for motion analysis" International Journal of Computer Vision, 1998, 21 pages.
Dosovitskiy et al, "FlowNet: Learning optical flow with convolutional networks" arXiv, May 2015, 13 pages.
Engel et al, "LSD-SLAM: Large-scale direct monocular SLAM" ECCV, 2014, 16 pages.
Godard et al, "Unsupervised monocular depth estimation with left-right consistency" arXiv, Apr. 2017, 14 pages.
Grundmann et al, "Efficient hierarchical graph based video segmentation" CVPR, 2010, 8 pages.
Horn et al, "Determining optical flow" Artificial Intelligence, 1981, 19 pages.
Hornacek et al, "Sphere-Flow: 6 DoF scene flow from RGB-D pairs" CVPR, 2014, 8 pages.
Jaderberg et al, "Spatial transformer networks" arXiv, Feb. 2016, 15 pages.
Katerina et al, Recurrent Network Models for Human Dynamics: IEEE International Conference on Computer Vision, Dec. 2015, 9 pages.
Kerl, "Dense visual SLAM for RGB-D cameras" IROS, 2013, 7 pages.
Kong et al, "Intrinsic depth: Improving depth transfer with intrinsic images" IEEE Internaitional Conference on Computer Vision, Dec. 2015, 9 pages.
Lezama et al, "Track to the future: Spatio-temporal video segmentation with long-range motion. cues" CVPR, 2011, 8 pages.
Mayer et al, "A large dataset to train convolutional networks for disparity, optical flow, and scene flow estimation" arXiv, Dec. 2015, 14 pages.
Misra et al, "Unsupervised learning using sequential verification for action recognition" ECCV, Mar. 2016, 19 pages.
Nir et al, "Over-parameterized variational optical flow" IJCV, 2008, 12 pages.
Ochs et al, "Object segmentation in video: a hierarchical variational approach for turning point trajectories into dense regions" International Conference on Computer Vision, 2011, 8 pages.
Patraucean et al, "Spatio-temporal video autoencoder with differentiable memory" arXiv, Sep. 2016, 13 pages.
PCT International Preliminary Report on Patentability in International Application No. PCT/US2017/064269, dated Jun. 4, 2019, 7 pages.
PCT International Search Report and Written Opinion in International Application No. PCT/US2017/064269, dated Mar. 26, 2018, 13 pages.
Prest et al, "Learning object class detectors from weakly annotated video" CVPR, Jul. 2012, 9 pages.
Revaud et al, "DeepMatching: Hierarchical deformable dense matching" arXiv, Oct. 2015, 22 pages.
Revaud et al, "EpicFlow: Edge-preserving interpolation of correspondences for optical flow" arXiv, May 2015, 11 pages.
Robinette et al, "The caesar project: A 3-d surface anthropometry survey" Second International Conference on 3-D Digital Imaging and Modeling, 1999, 7 pages.
Schöps et al, "Semi-dense visual odometry for AR on a smartphone" ISMAR, 2014, 6 pages.
Smith et al, "The development of embodied cognition: Six lessons from babies" Artificial Life, 2005, 18 pages.
Sturm et al, "A benchmark for the evaluation of RGB-D SLAM systems" IROS, 2012, 8 pages.
Sun et al, "Secrets of optical flow estimation and their principles" CVPR, 2010, 8 pages.
Thewlis et al, "Fully-trainable deep matching" BMVC, 2016, 12 pages.
Walker et al, "An uncertain future: Forecasting from static images using variational autoencoders" arXiv, Jun. 2016, 17 pages.
Wang et al, "Unsupervised learning of visual representations using videos" arXiv, Oct. 2015, 9 pages.
Wiskott et al, "Slow feature analysis: Unsupervised learning of invariances" Neural Computation, 2002, 56 pages.
Wu et al, "Single image 3D interpreter network" arXiv, Oct. 2016, 18 pages.
Wulff et al, "Lessons and insights from creating a synthetic optical flow benchmark" ECCV Workshop on Unsolved Problems in Optical Flow and Stereo Estimation, Oct. 2012, 10 pages.
www.blender.org [online], "Blender" [retrieved on Aug. 27, 2019], retrieved from: URL<https://www.blender.org/community/>, 1 page.
Xiao et al, "SUN database: Exploring a large collection of scene categories" IJCV, Aug. 2014, 20 pages.
Yao et al, "Describing Videos by Exploiting Temporal Structure" arXiv, Oct. 2015, 23 pages.
Yu et al, "Back to basics: Unsupervised learning of optical flow via brightness constancy and motion smoothness" arXiv, Aug. 2016, 4 pages.
Zelnik-Manor et al, "Multi-Frame Estimation of Planar Motion" IEEE Transactions on Pattern Analysis and Machine Intelligence, 2000, 12 pages.

* cited by examiner

DETERMINING STRUCTURE AND MOTION IN IMAGES USING NEURAL NETWORKS

CROSS-REFERENCE TO RELATED APPLICATION

This application is a National Stage Application under 35 U.S.C. § 371 and claims the benefit of International Application No. PCT/US2017/064269, filed on Dec. 1, 2017, which claims priority to U.S. Provisional Application Ser. No. 62/429,637, filed on Dec. 2, 2016. The disclosure of the prior application is considered part of and is incorporated by reference in the disclosure of this application.

BACKGROUND

This specification relates to processing images, e.g., video frames, using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, one innovative aspect of the subject matter described in this specification can be embodied in a system that includes one or more computers and one or more storage devices storing instructions that when executed by the one or more computers cause the one or more computers to implement: an encoder neural network configured to: receive a first image and a second image, and process the first image and the second image to generate an encoded representation of the first image and the second image; a scene structure decoder neural network configured to: process the encoded representation to generate a structure output characterizing a structure of a scene depicted in the first image; and a motion decoder neural network configured to: process the encoded representation to generate a motion output characterizing motion between the first image and the second image.

The foregoing and other embodiments can each optionally include one or more of the following features, alone or in combination. The encoder neural network may receive a concatenation of the first image and the second image. The encoder neural network can be a convolutional neural network. The structure output may include (i) a depth map specifying, for each of a plurality of pixels in the first image, a depth of the scene at the pixel and (ii) a respective segmentation mask corresponding to each of a plurality of object classes, each segmentation mask specifying, for each of the plurality of pixels, a likelihood that the scene at the pixel shows an object belonging to the corresponding object class. The scene structure decoder neural network can include a scene structure subnetwork that is configured to process the encoded representation to generate a shared decoded representation. The scene structure subnetwork can be a deconvolutional neural network. The scene structure decoder neural network may include a depth subnetwork configured to process the shared decoded representation to generate the depth map; and a segmentation subnetwork configured to process the shared decoded representation to generate the segmentation masks. The motion output may include (i) a first output defining motion of a camera from the first image to the second image and (ii) a second output defining motion of any objects belonging to the plurality of object classes from the first image to the second image. The second output defining motion of any objects belonging to the plurality of object classes, may include, for each of the object classes, values defining rotation and translation of any objects belonging to the object class from the first image to the second image. The motion decoder neural network may include one or more object motion neural network layers configured to process the encoded representation to generate, for each object class, the values defining rotation and translation of any objects belonging to the object class from the first image to the second image. The first output defining motion of the camera may include values defining rotation and translation of the camera from the first image to the second image. The motion decoder neural network may include one or more camera motion neural network layers configured to process the encoded representation to generate the values defining rotation and translation of the camera from the first image to the second image. The instructions may further cause the one or more computers to implement: a subsystem configured to perform operations comprising: generating, from the structure output and the motion output, an optical flow output that characterizes motion of pixels in the first image from the first image to the second image. The optical flow output may include generating, from the depth map, an initial three-dimensional (3D) point cloud representation of the scene depicted in the first image. Generating the optical flow output may further include transforming, using the segmentation masks and the second output defining motion of objects, the initial 3D point cloud to generate an initial transformed 3D point cloud. Generating the optical flow output may further include transforming, using the first output defining camera motion, the initial transformed 3D point cloud to generate a final transformed 3D point cloud. Generating the optical flow output may further include determining the optical flow output by projecting the final transformed 3D point cloud to a two-dimensional representation of the scene in the second image. The encoder neural network, the scene decoder neural network, and the motion decoder neural network may have been trained jointly. The neural networks may have been trained to generate depths that are consistent through estimated scene motion. The neural networks may have been trained in an unsupervised manner. The neural networks may have been supervised during the training by one or more of: ego-motion, depth, or ground-truth optical flow.

Another innovative aspect of the subject matter described in this specification can be embodied in a system that includes one or more computers and one or more storage devices storing instructions that when executed by the one or more computers cause the one or more computers to implement: a motion neural network configured to: receive a first image and a second image, and process the first image and the second image to generate (i) a motion output characterizing motion between the first image and the second image, and (ii) a motion segmentation mask output; and a scene structure neural network configured to: receive the first image, and process the first image to generate a depth map characterizing, for each of the plurality of pixels in the first image, a depth of the scene at the pixel; and a subsystem configured to generate, from the depth map, the motion output, and the motion segmentation mask output, an optical flow output that characterizes motion of pixels in the first image from the first image to the second image.

The foregoing and other embodiments can each optionally include one or more of the following features, alone or in combination. The motion neural network may include a motion-mask encoder subnetwork configured to process the first image and the second image to generate a first encoded representation of the first image and the second image. The motion-mask encoder subnetwork can be a convolutional neural network. The motion neural network may include a mask decoder subnetwork configured to process the first encoded representation of the first image and the second image to generate the motion segmentation mask output. The motion segmentation mask output may include a respective segmentation mask corresponding to each of a plurality of object classes, each segmentation mask specifying, for each of the plurality of pixels in the first image, a likelihood that the scene at the pixel shows an object belonging to the corresponding object class. The mask decoder subnetwork may include deconvolutional neural network layers. The mask decoder subnetwork further may include a 1×1 convolutional neural network layer and one or more sigmoid activation layers. The motion neural network may include a motion decoder subnetwork configured to process the first encoded representation of the first image and the second image to generate the motion output. The motion output may include (i) a first output defining motion of a camera from the first image to the second image and (ii) a second output defining motion of any objects belonging to the plurality of object classes from the first image to the second image. The first output defining motion of the camera may include values defining rotation and translation of the camera from the first image to the second image. The second output defining motion of any objects belonging to the plurality of object classes, may include, for each of the object classes, values defining rotation and translation of any objects belonging to the object class from the first image to the second image.

The motion decoder subnetwork may include one or more fully connected neural network layers configured to process the first encoded representation to (i) generate, for each object class, the values defining rotation and translation of any objects belonging to the object class from the first image to the second image, and (ii) generate the values defining rotation and translation of the camera from the first image to the second image. The scene structure neural network may include a scene structure encoder subnetwork configured to process the first image to generate a second encoded representation of the first image. The scene structure encoder subnetwork can be a convolutional neural network. The scene structure neural network comprises a scene structure decoder subnetwork configured to process the second encoded representation of the first image to generate the depth map. The scene structure decoder subnetwork includes one or more deconvolutional neural network layers. The scene structure decoder subnetwork further includes a 1×1 convolutional neural network layer and one or more RELU activation layers. Generating the optical flow output may include generating, from the depth map, an initial three-dimensional (3D) point cloud representation of the scene depicted in the first image; transforming, using the motion segmentation mask output and the second output defining motion of objects, the initial 3D point cloud to generate an initial transformed 3D point cloud; transforming, using the first output defining camera motion, the initial transformed 3D point cloud to generate a final transformed 3D point cloud; and determining the optical flow output by projecting the final transformed 3D point cloud to a two-dimensional representation of the scene in the second image.

The motion neural network and the scene structure neural network have been trained jointly. The motion neural network and the scene structure neural network have been trained to generate depths that are consistent through estimated scene motion. The neural networks have been trained in an unsupervised manner. The neural networks have been supervised during the training by one or more of: ego-motion, depth, or ground-truth optical flow.

The subject matter described in this specification can be implemented in particular embodiments so as to realize one or more of the following advantages. The systems described in this specification can effectively decompose image-to-image pixel motion in terms of scene and object depth, camera motion and 3D object rotations and translations. In particular, the systems can be trained with various degrees of supervision, and, in some cases, can generate accurate outputs despite being trained completely or mostly in an unsupervised manner. For example, the systems can successfully estimate segmentations of the objects in the scene, even though such supervision is never provided during the training. As the systems do not need to generate labeled datasets for supervised training, the systems can use less of their storage capacity, reducing system complexity and shortening the processing time while achieving the same or better results compared to existing systems. The systems effectively determine meaningful depth estimates or infill depth not captured by existing sensors and successfully estimates frame-to-frame camera displacements. The systems can also achieve accurate optical flow performance, which is useful for many applications such as predicting motion of moving objects in future images.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a neural network system implemented as computer programs on one or more computers in one or more locations. Generally, the neural network system is configured to receive as input a first image and a second image and to decompose image-to-image pixel motion from the first image to the second image in terms of image depth, segmentation, camera motion, and 3D object motion (e.g., rotations and translations). The neural network system can then convert the image depth, segmentation, camera motion, and 3D object motion into a dense imageto-image motion field, i.e., an optical flow, that characterizes motion of pixels in the first image from the first image to the second image.

Figure 1:
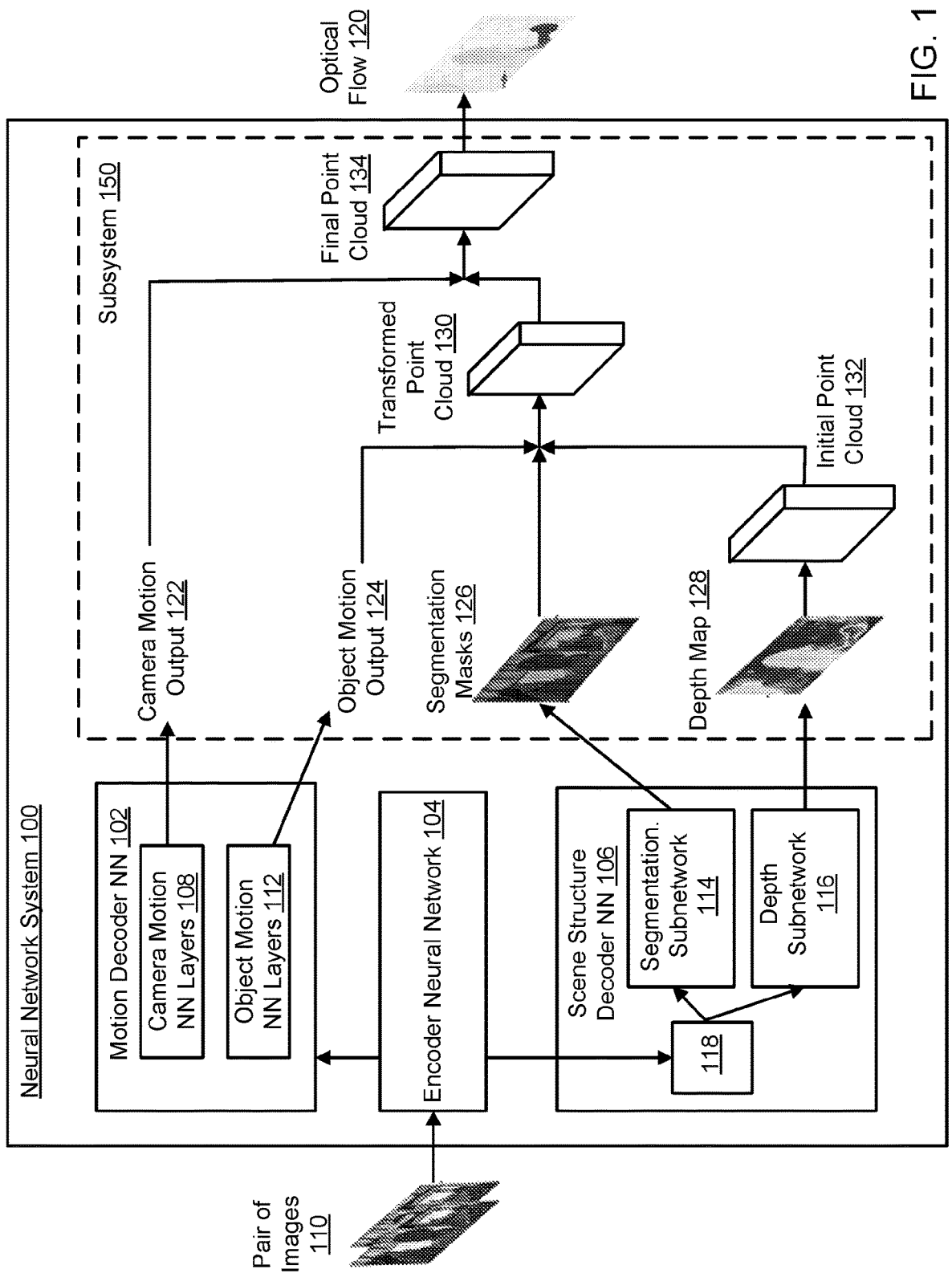
FIG. 1 shows an architecture of an example neural network system.

FIG. 1 shows an example architecture of a neural network system 100. The neural network system 100 is an example of a system implemented as computer programs on one or more computers in one or more locations, in which the systems, components, and techniques described below can be implemented. The system 100 includes an encoder neural network 104, a scene structure decoder neural network 106, and a motion decoder neural network 102.

The encoder neural network 104 is configured to receive a pair of images 110 including a first image and a second image. The first and second images may be two consecutive images in a sequence of images having the same size. For example, the pair of images 110 can be frames of a video taken by a camera of a robotic agent. In some implementations, the encoder neural network 104 is configured to receive a concatenation of the first image and the second image. The encoder neural network 104 is then configured to process the first and second images or the concatenation of the two images to generate an encoded representation of the first image and the second image.

In particular, the encoder neural network 104 is a convolutional neural network that includes one or more convolutional neural network layers (e.g., 3×3 convolutional layers). The encoder neural network 104 may alternate convolutional neural network layers with strides 1 and 2. The encoder neural network 104 processes the first and second images through each of the convolutional neural network layers to collectively generate the encoded representation of the first and second images. In some implementations, the network 104 includes a respective batch normalization layer following each of the convolutional neural network layers. Each batch normalization layer is configured to apply batch normalization on the output of the convolutional neural network layer preceding the batch normalization layer. The encoded representation generated by the encoder neural network 104 using the convolutional layers includes a down-sampled output, e.g. a down-sampled feature map characterizing features extracted from the first image and second image and having a lower resolution than the first and second images, e.g., smaller width and height dimension. The down-sampled feature map can have a depth dimension much larger than the depth dimension of the first and second images. For example, the size of the first and second images may be (320, 240, 3), where 3 is the depth dimension of the first and second images (i.e., R, G, and B dimensions), and the size of the down-sampled feature map may be (20, 15, y), where y is the depth dimension of the down-sampled feature map and much larger than the depth dimension of the first and second images. For example, y may be 512.

The scene structure decoder neural network 106 is generally configured to process the encoded representation to generate a structure output characterizing a structure of a scene depicted in the first image. The structure output includes a depth map 128 and segmentation masks 126.

In particular, the scene structure decoder neural network 106 includes a scene structure subnetwork 118. The scene structure subnetwork 118 is a deconvolutional neural network including multiple deconvolutional neural network layers. The scene structure subnetwork 118 is configured to depth-to-space upsample the encoded representation through each of the deconvolutional neural network layers in the subnetwork 118 to generate a shared decoded representation. The shared decoded representation includes an up-sampled feature map having higher resolution than the down-sampled feature map. The resolution of the up-sampled feature map can be the same as the first and second images. For example, the up-sampled feature map can have the same width and height dimensions as the first and second images but with a different depth dimension z (e.g., the size of the up-sampled feature map is (320, 240, z). The depth dimension z can be much smaller than the depth dimension y of the down-sampled feature map. For example, z can be 32.

The scene structure decoder neural network 106 includes a depth subnetwork 116 configured to process the shared decoded representation to generate a depth map 128. The depth map 128 specifies, for each of the plurality of pixels in the first image or in the second image, a depth of the scene at the pixel. More specifically, the depth map 128 includes multiple points, in which each point is associated with a depth value for a pixel of multiple pixels in the first image (or in the second image) that represents a respective distance of a scene depicted at the pixel from a focal plane of the first image (or of the second image). In some implementations, the depth subnetwork 116 may generate the depth map $d_t$ using a 1×1 convolutional neural network layer followed by one or more RELU activation neural network layers. The depth subnetwork 116 may use the RELU activation layers because depth values are non-negative. The RELU activation layers may have a bias of 1 to prevent small depth values, because small depth values may correspond to objects that are very close to the camera and therefore are more likely noise rather than valid depth values.

The scene structure decoder neural network 106 includes a segmentation subnetwork 114 configured to process the shared decoded representation to generate segmentation masks 126. In some implementations, the segmentation subnetwork 114 includes a 1×1 convolutional neural network layer followed by one or more sigmoid activation neural network layers.

The segmentation masks 126 include a respective segmentation mask corresponding to each of multiple object classes depicted in the first image. Generally, the segmentation mask corresponding to a given object class specifies, for each of multiple pixels in the first image, a probability that the scene at the pixel shows an object belonging to the corresponding object class. In particular, in some cases, the segmentation mask corresponding to a given object class specifies, for every pixel in the first image, a probability that the scene at the pixel shows an object belonging to the corresponding object class. In other cases, the segmentation mask can include a respective probability for each pixel in a down-sampled or lower-resolution version of the first image For example, assuming the first image $I_t$ has width w and height h, the subnetwork 114 can generate a set of K segmentation masks $m_t^k \in [0,1]$w×h, where k belongs to a predetermined set of K object classes {1, . . . K}. Each segmentation mask $m_t^k$ corresponding to object class k specifies membership probability of each of multiple pixels in the first image $I_t$ to the object class k, i.e. a probability that the scene at the pixel shows an object belonging to the object class k. Although in this example, the K segmentation masks are for the first image, in some implementations, the K segmentation masks can be generated for the second image.

The motion decoder neural network 102 is generally configured to process the encoded representation to generate a motion output characterizing motion between the first image and the second image. The motion output includes (i) a camera motion output 122 defining motion of a camera from the first image to the second image, and (ii) an object motion output 124 defining motion of any objects belonging to the multiple object classes from the first image to the second image.

In particular, the camera motion output 122 includes values defining rotation and translation of the camera from the first image to the second image. The motion decoder neural network 102 includes camera motion neural network layers 108 configured to process the encoded representation to generate the values defining rotation and translation of the camera from the first image to the second image. In some implementations, the camera motion neural network layers 108 include fully-connected neural network layers.

The object motion output 124 includes, for each of the object classes, values defining rotation and translation of any objects belonging to the object class from the first image to the second image. The motion decoder neural network 102 includes one or more object motion neural network layers 112 configured to process the encoded representation to generate, for each object class, the values defining rotation and translation of any objects belonging to the object class from the first image to the second image. In some implementations, the object motion neural network layers 112 include fully-connected neural network layers.

In some cases, the neural network system 100 also includes a subsystem 150 that generates an optical flow 120 from the depth map 128, the segmentation masks 126, the camera motion output 122 and the object motion output 124. The optical flow 120 characterizes motion of pixels in the first image from the first image to the second image.

To generate the optical flow 120, the subsystem 150 first generates, from the depth map 128, an initial three-dimensional (3D) point cloud 132 corresponding to the pixels in the scene depicted in the first image. The subsystem 150 can generate the initial 3D point cloud 132 using estimated or known camera intrinsics. The subsystem 150 then transforms, using the segmentation masks 126 and the object motion output 124, the initial 3D point cloud 132 to generate an initial transformed 3D point cloud 130. Subsequently, the subsystem 150 transforms, using the camera motion output 122, the initial transformed 3D point cloud 130 to generate a final transformed 3D point cloud 134. The subsystem 150 then determines the optical flow 120 by projecting the final transformed 3D point cloud 134 to a two-dimensional representation of the scene in the second image. The process for generating an optical flow from a depth map, segmentation masks, and motion output is described in more detail below with reference to FIG. 5.

In some implementations, once the optical flow is determined, the optical flow can be used to detect and track motion of moving objects depicted in the first image and the second images. Based on the detected and tracked motion, the motion of these moving objects can be modeled and their motion in future images can be predicted based on the model.

In some other implementations, the optical flow can be used to estimate the motion of the camera (e.g., if it was mounted on a robot agent such as a self-driving car) and/or to compute the velocity of moving objects in the first and second images. In some other implementations, the optical flow can be used to perform motion analysis for recognizing what actions are being performed by a robotic agent.

Figure 2:
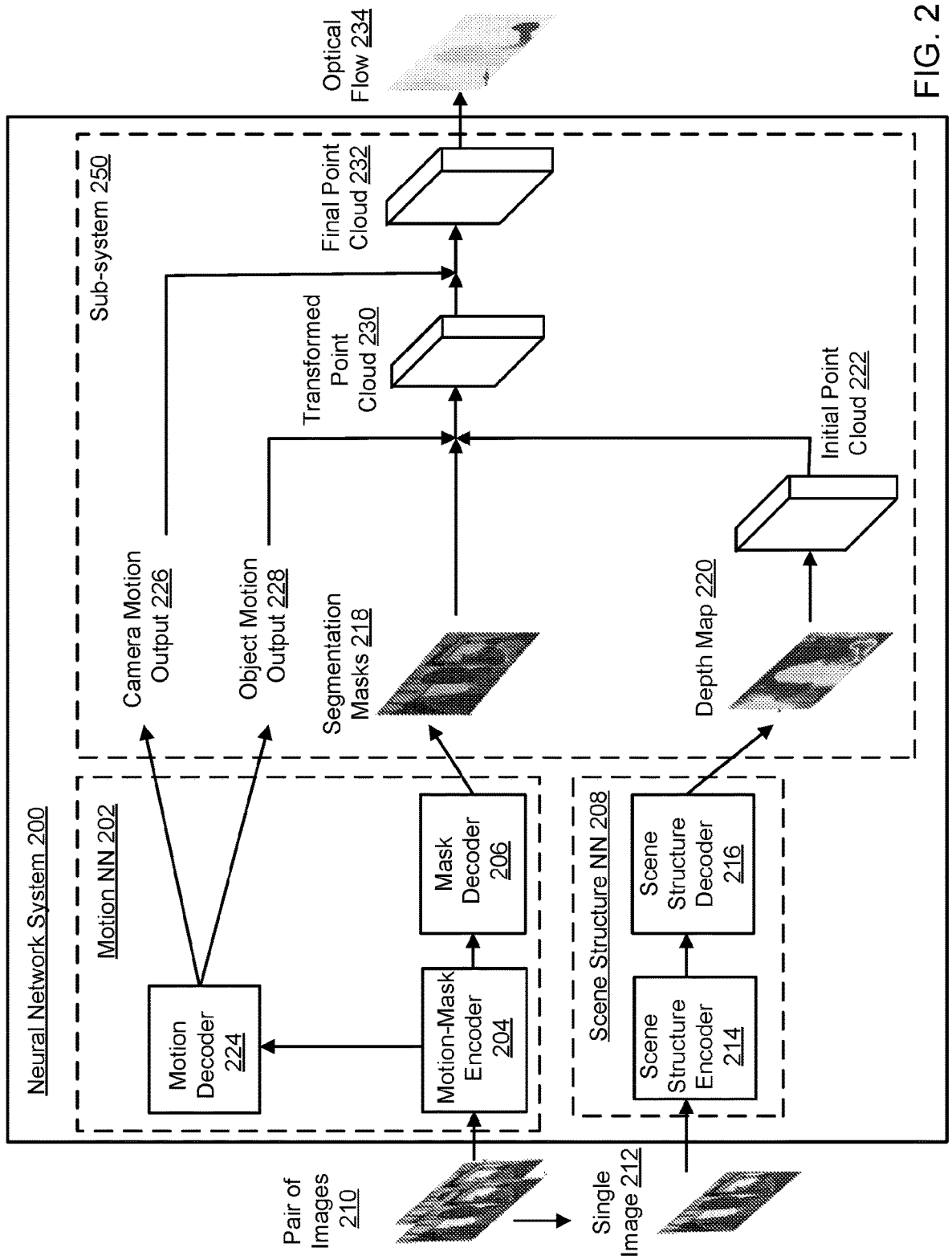
FIG. 2 shows an architecture of another example neural network system.

FIG. 2 shows an architecture of another example neural network system 200. The neural network system 200 is an example of a system implemented as computer programs on one or more computers in one or more locations, in which the systems, components, and techniques described herein can be implemented. The system 200 generally includes a motion neural network 202, a scene structure neural network 208, and a subsystem 250. In some implementations, the subsystem 250 can be the same as or similar to the subsystem 150 of the neural network system 100 of FIG. 1.

The motion neural network 202 is generally configured to receive as input a pair of images 210 including a first image and a second image and to generate, from the first image and the second image, (i) a motion output characterizing motion between the first image and the second image, and (ii) a motion segmentation mask output. The first and second images can be two consecutive images in a sequence of images having the same size. For example, the first and second images can be frames from a video, e.g., a video taken by a camera of a robotic agent.

In particular, the motion neural network 202 includes a motion-mask encoder subnetwork 204, a mask decoder subnetwork 206, and a motion decoder subnetwork 224. The motion-mask encoder subnetwork 204 is configured to receive the first image and the second image. In some implementations, the encoder neural network 104 is configured to receive a concatenation of the first image and the second image. The motion-mask encoder subnetwork 204 can be a convolutional neural network that includes one or more convolutional neural network layers. For example, the motion-mask encoder 204 may include multiple 3×3 convolutional neural network layers alternating between stride 1 and stride 2. The motion-mask encoder neural network 204 is then configured to process the first and second images or the concatenation of the two images through each of the convolutional neural network layers to collectively generate a first encoded representation of the first image and the second image. The first encoded representation includes a down-sampled output, e.g., a down-sampled feature map characterizing features extracted from the first image and second image and having a lower resolution than the first and second images. e.g., smaller width and height dimensions. The down-sampled feature map may have a depth dimension much larger than the depth dimension of the first and second images (due to the depth-concatenation of the outputs of the convolutional neural network layers). For example, the size of the first and second images may be (320, 240, 3), where 3 is the depth dimension of the first and second images (i.e., R, G, and B dimensions), and the size of the down-sampled feature map may be (20, 15, y), where y is the depth dimension of the down-sampled feature map and much larger than the depth dimension of the first and second images. For example, y may be 512.

Each of the convolutional layers in the motion-mask encoder 204 can be followed by a batch normalization layer that applies batch normalization on the respective output of the convolutional layer.

The mask decoder subnetwork 206 is generally configured to process the first encoded representation of the first image and the second image to generate the motion segmentation mask output that includes multiple segmentation masks 218.

More specifically, the mask decoder subnetwork 224 may include deconvolutional neural network layers configured to depth-to-space upsample the first encoded representation to generate a first decoded representation of the first and second images. The first decoded representation includes an up-sampled feature map having higher resolution than the down-sampled feature map. The resolution of the up-sampled feature map can be the same as the first and second images. For example, the up-sampled feature map can have the same width and height dimensions as the first and second images but with a different depth dimension z (e.g., the size of the up-sampled feature map is (320, 240, z). The depth dimension z can be much smaller than the depth dimension y of the down-sampled feature map. For example, z can be 32.

In some implementations, the mask decoder subnetwork 206 may further include a 1×1 convolutional neural network layer and one or more sigmoid activation layers. The 1×1 convolutional neural network layer and one or more sigmoid activation layers may be configured to process the first decoded representation to generate the segmentation masks 218.

The segmentation masks 218 includes a respective segmentation mask corresponding to each of multiple object classes depicted in the first image or in the second image. Each segmentation mask specifying, for each of multiple pixels in the first image or in the second image, a probability that the scene at the pixel shows an object belonging to the corresponding object class. For example, assuming the first image $I_t$ having width w and height h, the mask decoder subnetwork 206 generates a set of K segmentation masks $m_t^k \in [0,1]^{w \times h}$, where k belongs to a predetermined set of K object classes $\{1, \ldots K\}$. Each segmentation mask $m_t^k$ corresponding to object class k specifies membership probability of each of multiple pixels in the first image $I_t$ to the object class k, i.e. a probability that the scene at the pixel shows an object belonging to the object class k. Although in this example, the K segmentation masks are for the first image, in some implementations, the K segmentation masks can be generated for the second image.

The motion decoder subnetwork 224 is configured to process the first encoded representation to generate the motion output that includes a camera motion output 226 and an object motion output 228. The camera motion output 226 defines motion of the camera from the first image to the second image by including values defining rotation and translation of the camera from the first image to the second image. The object motion output 228 defining motion of any objects belonging to the multiple object classes depicted in the first image. The object motion output 228 includes, for each of the object classes, values defining rotation and translation of any objects belonging to the object class from the first image to the second image. In some implementations, the motion decoder subnetwork 224 includes one or more fully connected neural network layers.

While the motion neural network 202 takes a pair of images 210 as input, the scene structure neural network 208 can only take a single image 212 as input. For example, the scene structure neural network 208 receives the first image in the pair of images 210 as input. The scene structure neural network 208 can generate, from the first image, a depth map 220 characterizing, for each of multiple pixels in the first image, a depth of the scene at the pixel. More specifically, the depth map 220 includes multiple points, in which each point is associated with a depth value for a pixel of multiple pixels in the first image that represents a respective distance of a scene depicted at the pixel from a focal plane of the first image.

The scene structure neural network 208 can include a scene structure encoder subnetwork 214 and a scene structure decoder subnetwork 216.

The scene structure encoder subnetwork 214 can be a convolutional neural network that includes one or more convolutional neural network layers (e.g., 3×3 convolutional layers). The scene structure encoder subnetwork 214 may alternate convolutional neural network layers with strides 1 and 2. The scene structure encoder subnetwork 214 processes the first image through each of the convolutional neural network layers to collectively generate the second encoded representation of the first image. In some implementations, the encoder subnetwork 214 includes a respective batch normalization layer following each of the convolutional neural network layers. Each batch normalization layer is configured to apply batch normalization on the output of the convolutional neural network layer preceding the batch normalization layer. The second encoded representation generated by the encoder subnetwork 214 using the convolutional layers includes a down-sampled output, e.g. a feature map characterizing features extracted from the first image and having a lower resolution than the first image.

The scene structure decoder subnetwork 216 is generally configured to process the second encoded representation to generate the depth map 220. In some implementations, the scene structure decoder subnetwork 216 can be a deconvolutional neural network including multiple deconvolutional neural network layers. The scene structure decoder subnetwork 216 is configured to depth-to-space upsample the second encoded representation through each of the deconvolutional neural network layers in the scene structure decoder subnetwork 216 to collectively generate an up-sampled feature map that has the same resolution as the first image.

In some implementations, the scene structure decoder subnetwork 216 can further include a 1×1 convolutional neural network layer followed by one or more RELU activation neural network layers. The subnetwork 216 processes the up-sampled feature map using the 1×1 convolutional layer and RELU activation layers to predict the depth map 220. The subnetwork 216 may use the RELU activation layers because depth values are positive and may use a bias of 1 to prevent small depth values. In some implementations, the maximum predicted depth value can be capped at 100 to prevent large gradients.

The subsystem 250 is configured to generate an optical flow 234 from the depth map 220, the segmentation masks 218, the camera motion output 226, and the object motion output 228. The optical flow 234 characterizes motion of pixels in the first image from the first image to the second image.

To generate the optical flow 234, the subsystem 250 first generates, from the depth map 220, an initial three-dimensional (3D) point cloud 222 corresponding to the pixels in the scene depicted in the first image. The subsystem 250 can generate the initial 3D point cloud 222 using estimated or known camera intrinsics. The subsystem 250 then transforms, using the segmentation masks 218 and the object motion output 228, the initial 3D point cloud 222 to generate an initial transformed 3D point cloud 230. Subsequently, the subsystem 250 transforms, using the camera motion output 226, the initial transformed 3D point cloud 230 to generate a final transformed 3D point cloud 232. The system then determines the optical flow 234 by projecting the final transformed 3D point cloud 232 to a two-dimensional representation of the scene in the second image. The process for generating an optical flow from a depth map, segmentation masks, and a motion output is described in more detailed below with reference to FIG. 5.

In some implementations, once the optical flow is determined, the optical flow can be used to detect and track motion of moving objects depicted in the first image and the second images. Based on the detected and tracked motion, the motion of these moving objects can be modeled and their motion in future images can be predicted based on the model.

In some other implementations, the optical flow can be used to estimate the motion of the camera (e.g., if it was mounted on a robot agent such as a self-driving car) and/or to compute the velocity of moving objects in the first and second images. In some other implementations, the optical flow can be used to perform motion analysis for recognizing what actions are being performed by a robotic agent.

Figure 3:
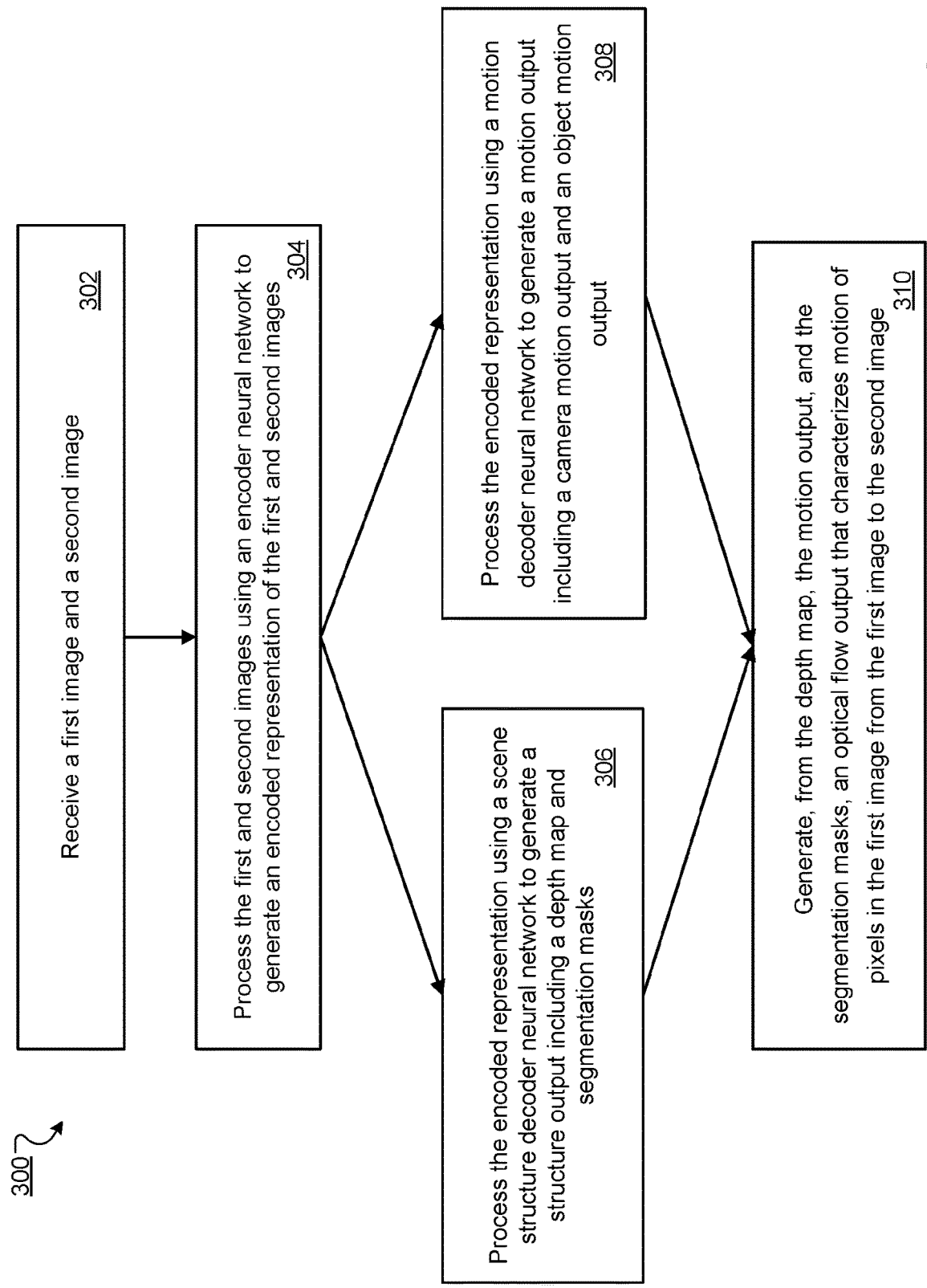
FIG. 3 is a flow diagram of a first example process for generating an optical flow from a pair of input images.

FIG. 3 is a flow diagram of a first example process for generating an optical flow from a pair of input images. For convenience, the process will be described as being performed by a system of one or more computers located in one or more locations. For example, a neural network system, e.g., the neural network system 100 of FIG. 1, appropriately programmed, can perform the process.

The system receives a first image and a second image (step 302). The first and second images can be frames from a video, e.g., a video taken by a camera of a robotic agent.

For example, the first and second images can be two consecutive images $I_t$ and $I_{t+1}$ in a sequence of images, each having width w and height h. The sequence of images can be frames from a video, but the sequence does not necessarily have to include all of the frames from the video. For example, the sequence could include every other frame.

The system processes the first and second images using an encoder neural network to generate an encoded representation of the first and second images (step 304). In particular, the encoder neural network includes one or more convolutional neural networks. The system processes the first and second images through each of the convolutional neural network to generate the encoded representation. The encoded representation includes a down-sampled output, e.g. a down-sampled feature map characterizing features extracted from the first image and second image and having a lower resolution than the first and second images, e.g., smaller width and height dimension. The down-sampled feature map can have a depth dimension much larger than the depth dimension of the first and second images. For example, the size of the first and second images may be (320, 240, 3), where 3 is the depth dimension of the first and second images (i.e., R, G, and B dimensions), and the size of the down-sampled feature map may be (20, 15, y), where y is the depth dimension of the down-sampled feature map and much larger than the depth dimension of the first and second images. For example, y may be 512.

The system processes the encoded representation using a scene structure decoder neural network to generate a structure output including a depth map and segmentation masks (step 306).

In particular, the system first depth-to-space upsamples the encoded representation using one or more deconvolutional neural network layers (e.g., the deconvolutional neural network layers in the scene structure subnetwork 118 of FIG. 1) to generate a shared decoded representation, i.e., an up-sampled feature map having higher resolution than the down-sampled feature map. The resolution of the up-sampled feature map can be the same as the first and second images. For example, the up-sampled feature map can have the same width and height dimensions as the first and second images but with a different depth dimension z (e.g., the size of the up-sampled feature map is (320, 240, z). The depth dimension z can be much smaller than the depth dimension y of the down-sampled feature map. For example, z can be 32.

The system then processes the up-sampled feature map using a convolutional neural network layer and one or more RELU activation neural network layers (e.g., the 1×1 convolutional layer and RELU activation layers in the depth subnetwork 116 of FIG. 1) to generate the depth map characterizing, for each of multiple pixels in the first image, a depth of the scene depicted at the pixel. More specifically, the depth map includes multiple points, in which each point is associated with a depth value for a pixel of multiple pixels in the first image that represents a respective distance of a scene depicted at the pixel from a focal plane of the first image. The system may use the RELU activation layers because depth values are positive and may use a bias of 1 to prevent small depth values. The depth map can be denoted as $d_t \in \Re^{w \times h}$.

The system further processes the up-sampled feature map using a convolutional neural network layer, e.g., a 1×1 convolutional neural network layer, and one or more sigmoid activation neural network layers (e.g., the 1×1 convolution layer followed by one or more sigmoid activation layers in the segmentation subnetwork 114 of FIG. 1) to generate segmentation masks.

The segmentation masks include a respective segmentation mask corresponding to each of multiple object classes depicted in the first image. Each segmentation mask specifying, for each of multiple pixels in the first image, a probability that the scene at the pixel shows an object belonging to the corresponding object class.

For example, assuming the first image $I_t$ having width w and height h, the subnetwork 114 generates a set of K segmentation masks $m_t^k \in [0,1]^{w \times h}$, where k belongs to a predetermined set of K object classes $\{1, \ldots K\}$. Each segmentation mask $m_t^k$ corresponding to object class k specifies membership probability of each of multiple pixels in the first image $I_t$ to the object class k, i.e. a probability that the scene at the pixel shows an object belonging to the object class k.

The system may use sigmoid activation layers in order to allow each pixel to belong to any number of moving object classes K. When a pixel has zero activation across all K segmentation masks, the pixel is assigned to the static background and the corresponding flow is a function of the camera motion alone. The system allows a pixel to belong to multiple moving object classes in order to capture composition of motions, e.g., through kinematic chains, such as in articulated bodies.

The system processes the encoded representation using a motion decoder neural network (e.g., the motion decoder neural network 102 of FIG. 1) to generate a motion output (step 308). The motion output includes (i) a camera motion output defining motion of a camera from the first image to the second image, and (ii) an object motion output defining motion of any objects belonging to the multiple object classes from the first image to the second image.

The system processes the encoded representation using one or more camera motion neural network layers (e.g., fully connected neural network layers) to generate as camera motion output the values defining 3D rotation and translation of the camera from the first image to the second image. Let $\{R_t^c, t_t^c\}$ denote the 3D rotation and translation of the camera from the first image $I_t$ to the second image $I_{t+1}$. The system can represent $R_t^c$ using an Euler angle representation.

The system processes the encoded representation using one or more object motion neural network layers (e.g., fully connected neural network layers) to generate, for each object class, the values defining rotation and translation of any objects belonging to the object class from the first image to the second image. The values defining rotation and translation are included in the object motion output. Let $\{R_t^k, t_t^k\}$, $k \in \{1, \ldots k\}$ denote the 3D rotation and translation of the K moving object classes in the scene depicted at each pixel. The system can use similar representations as for camera motion. While camera motion is a global transformation applied to all the pixels in the scene, the object motion transforms are weighted by the predicted membership probability to K segmentation masks $m_t^k \in [0,1]^{w \times h}$, $k \in 1, \ldots, K$.

The system generates, from the depth map, the motion output, and the segmentation masks, an optical flow output that characterizes motion of pixels in the first image from the first image to the second image (step 310). Generally, the system generates the optical flow output by first transforming a point cloud generated from the depth map using the camera and object motion output and segmentation masks followed by projecting the final 3D point cloud on to an image plane using camera intrinsics. The process for generating an optical flow from a depth map, segmentation masks, and a motion output is described in more detail below with reference to FIG. 5.

Figure 4:
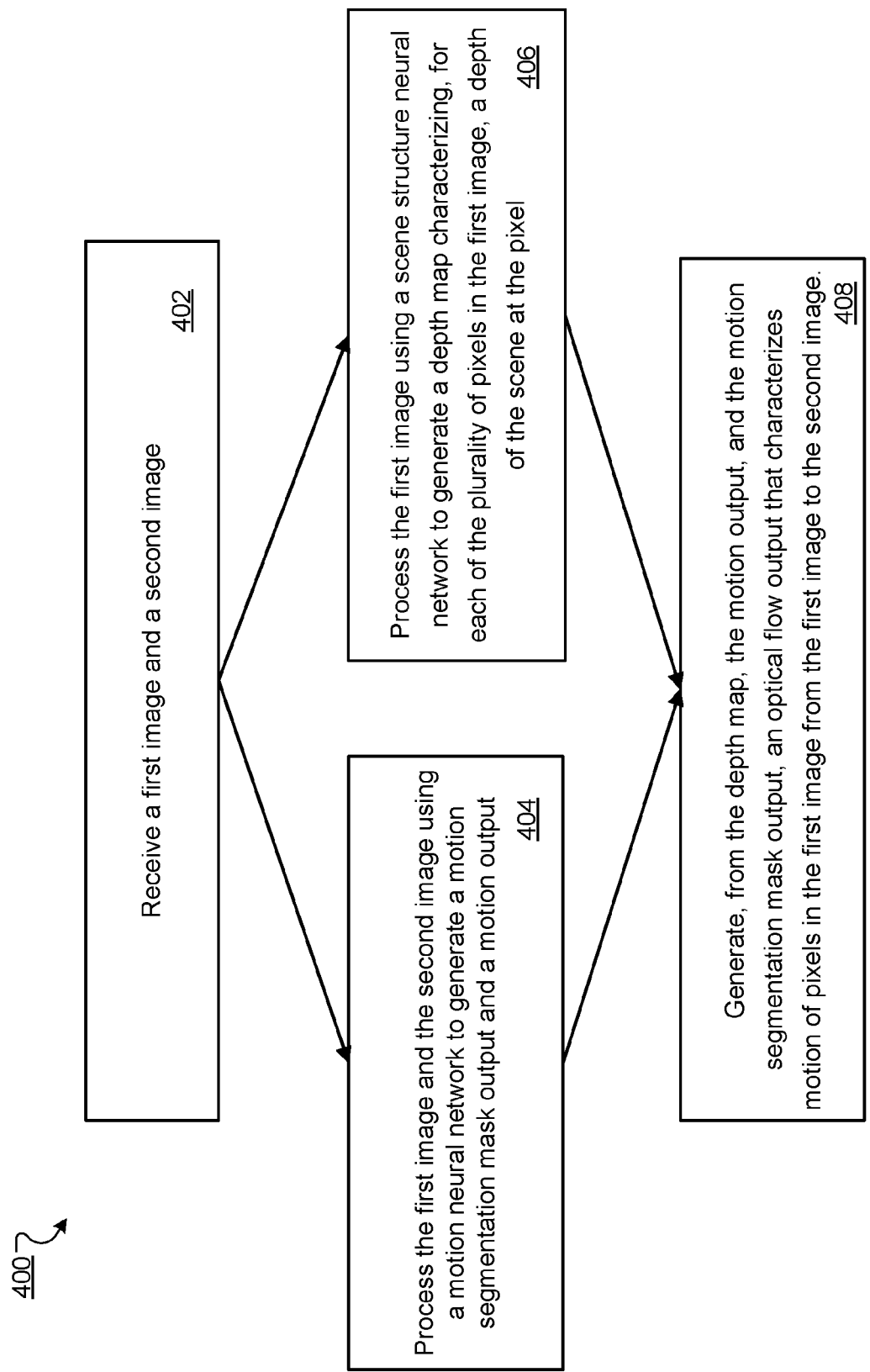
FIG. 4 is a flow diagram of a second example process for generating an optical flow from a pair of input images.

FIG. 4 is a flow diagram of a second example process for generating an optical flow from a pair of input images. For convenience, the process will be described as being performed by a system of one or more computers located in one or more locations. For example, a neural network system, e.g., the neural network system 200 of FIG. 2, appropriately programmed, can perform the process.

The system receives a first image and a second image (step 402). The first and second images can be frames from a video, e.g., a video taken by a camera of a robotic agent.

For example, the first and second images can be two consecutive images $I_t$ and $I_{t+1}$ in a sequence of images, each having width w and height h. The sequence of images can be frames from a video, but the sequence does not necessarily have to include all of the frames from the video. For example, the sequence could include every other frame.

The system processes the first image and the second image using a motion neural network to generate a motion segmentation mask output and a motion output (step 404).

In particular, the system first processes the first and second images using a motion-mask encoder subnetwork (e.g., the motion-mask encoder subnetwork 204 of FIG. 1) to generate a first encoded representation of the first and second images. The motion-mask encoder can be a convolutional neural network that includes one or more convolutional neural network layers. For example, the motion-mask encoder may include multiple 3×3 convolutional neural network layers alternating between stride 1 and stride 2. The system processes the first and second images or a concatenation of the two images through each of the convolutional neural network layers of the motion-mask decoder subnetwork to collectively generate the first encoded representation. The first encoded representation includes a down-sampled output, e.g., a down-sampled feature map characterizing features extracted from the first image and second image and having a lower resolution than the first and second images, e.g., smaller width and height dimensions. The down-sampled feature map may have a depth dimension much larger than the depth dimension of the first and second images (due to the depth-concatenation of the outputs of the convolutional neural network layers). For example, the size of the first and second images may be (320, 240, 3), where 3 is the depth dimension of the first and second images (i.e., R, G, and B dimensions), and the size of the down-sampled feature map may be (20, 15, y), where y is the depth dimension of the down-sampled feature map and much larger than the depth dimension of the first and second images. For example, y may be 512.

Optionally, the system can apply batch normalization on a respective output of each of the convolutional neural network layers by using a batch normalization layer following each convolutional neural network layer.

The system then processes the first encoded representation of the first image and the second image using a mask decoder subnetwork (e.g., the mask decoder subnetwork 206 of FIG. 2) to generate the motion segmentation mask output that includes multiple segmentation masks.

In particular, the mask decoder subnetwork includes one or more deconvolutional neural network layers. The system depth-to-space upsamples the first encoded representation using the deconvolutional neural network layers to collectively generate a first decoded representation of the first and second images. The first decoded representation includes an up-sampled feature map having higher resolution than the down-sampled feature map. The resolution of the up-sampled feature map can be the same as the first and second images. For example, the up-sampled feature map can have the same width and height dimensions as the first and second images but with a different depth dimension z (e.g., the size of the up-sampled feature map is (320, 240, z). The depth dimension z can be much smaller than the depth dimension y of the down-sampled feature map. For example, z can be 32.

The mask decoder subnetwork can further include a convolutional neural network layer (e.g., a 1×1 convolutional layer) and one or more sigmoid activation layers. The system processes the first decoded representation using the convolutional neural network layer and one or more sigmoid activation layers to generate the segmentation masks.

The segmentation masks include a respective segmentation mask corresponding to each of multiple object classes depicted in the first image. Each segmentation mask specifying, for each of multiple pixels in the first image, a probability that the scene at the pixel shows an object belonging to the corresponding object class. For example, assuming the first image $I_t$ having width w and height h, the mask decoder subnetwork 206 generates a set of K segmentation masks $m_t^k \in [0,1]^{w \times h}$, where k belongs to a predetermined set of K object classes $\{1, \ldots K\}$. Each segmentation mask $m_t^k$ corresponding to object class k specifies membership probability of each of multiple pixels in the first image $I_t$ to the object class k, i.e. a probability that the scene at the pixel shows an object belonging to the object class k. In some implementations, a pixel may be assigned to none of the segmentation masks because it is a background pixel and part of the static world.

The system uses sigmoid activation layers in order to allow each pixel to belong to any number of object classes K. When a pixel has zero activation across all K segmentation masks, the pixel is assigned to the static background and the corresponding flow is a function of the camera motion alone. The system allows a pixel to belong to multiple object classes in order to capture composition of motions, e.g., through kinematic chains, such as in articulated bodies.

The system processes the first encoded representation using a motion decoder subnetwork (e.g., the motion decoder subnetwork 224 of FIG. 2) to generate to a motion output. The motion decoder subnetwork can include one or more fully connected neural network layers. The motion output includes (i) a camera motion output defining motion of a camera from the first image to the second image, and (ii)

an object motion output defining motion of any objects belonging to the multiple object classes from the first image to the second image.

The system processes the first encoded representation using the one or more fully connected neural network layers to generate as camera motion output the values defining 3D rotation and translation of the camera from the first image to the second image. Let $\{R^c_t, t^c_t\}$ denote the 3D rotation and translation of the camera from the first image $I_t$ to the second image $I_{t+1}$. The system can represent $R^c_t$ using an Euler angle representation.

The system further processes the encoded representation using the one or more fully connected neural network layers to generate, for each object class, the values defining rotation and translation of any objects belonging to the object class from the first image to the second image. The values defining rotation and translation are included in the object motion output. Let $\{R^k_t, t^k_t\}$, $k \in \{1, \ldots, K\}$ denote the 3D rotation and translation of the K moving object classes in the scene depicted at each pixel. The system can use similar representations as for camera motion. While camera motion is a global transformation applied to all the pixels in the scene, the object motion transforms are weighted by the predicted membership probability to K segmentation masks $m^k_t \in [0,1]^{w \times h}$, $k \in 1, \ldots, K$.

While the system processes both the first and second images to generate the motion output and segmentation masks, the system processes only a single image, e.g., the first image to generate a depth map. The system generates the depth map using a scene structure neural network (e.g., the scene structure neural network 208 of FIG. 2) (step 406).

The depth map characterizes, for each of multiple pixels in the first image, a depth of the scene at the pixel. More specifically, the depth map includes multiple points, in which each point is associated with a depth value for a pixel of multiple pixels in the first image that represents a respective distance of a scene depicted at the pixel from a focal plane of the first image. The depth map for the first image $I_t$ can be denoted as $d_t \in \Re^{w \times h}$.

The scene structure neural network includes a scene structure encoder subnetwork and a scene structure decoder subnetwork.

The encoder neural network includes one or more convolutional neural networks. The system processes the first image through each of the convolutional neural network to generate a second encoded representation of the first image. The second encoded representation includes a down-sampled output, e.g. a feature map characterizing features extracted from the first image and having a lower resolution than the first image.

The scene structure decoder subnetwork includes one or more deconvolutional neural network layers. The system depth-to-space upsamples the second encoded representation using the one or more deconvolutional neural network layers to generate a second decoded representation, i.e., an up-sampled feature map that has the same resolution as the first and second image.

The scene structure decoder subnetwork further includes a convolutional neural network layer (e.g., a 1×1 convolutional layer) and one or more RELU activation neural network layers. The system may process the up-sampled feature map using the convolutional neural network layer and the one or more RELU activation neural network layers to generate the depth map. The system may use the RELU activation layers because depth values are positive and may use a bias of 1 to prevent small depth values The system generates, from the depth map, the motion output, and the segmentation masks, an optical flow output that characterizes motion of pixels in the first image from the first image to the second image (step 408). Generally, the system generates the optical flow output by first transforming a point cloud generated from the depth map using the camera and object motion output and segmentation masks followed by projecting the final 3D point cloud on to an image plane using camera intrinsics. The process for generating an optical flow from a depth map, segmentation masks, and a motion output is described in more detail below with reference to FIG. 5.

Figure 5:
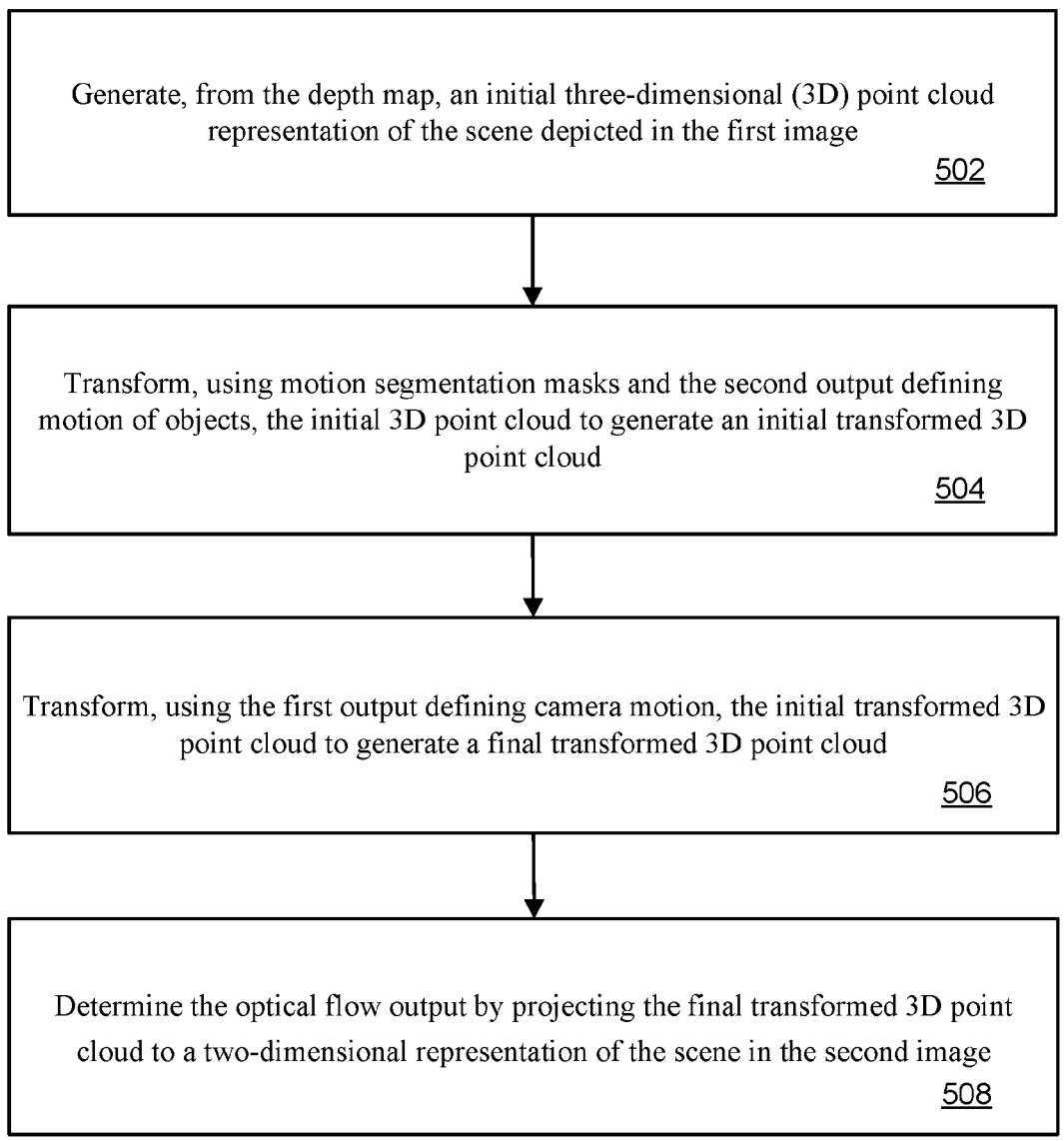
FIG. 5 is a flow diagram of an example process for processing a depth map, a motion output, and segmentation masks to generate an optical flow.

FIG. 5 is a flow chart of an example process for processing a depth map, a motion output including a camera motion output and object motion output, and segmentation masks to generate an optical flow. For convenience, the process will be described as being performed by a system of one or more computers located in one or more locations. For example, a neural network system, e.g., the neural network system 100 of FIG. 1 or the neural network system 200 of FIG. 2, appropriately programmed, can perform the process.

The system generates, from the depth map, an initial three-dimensional (3D) point cloud representing the scene depicted in the first image (step 502).

In particular, given depth map $d_t$, the system generates the initial 3D point cloud $X^i_t = (X^i_t, Y^i_t, Z^i_t)$, $i \in 1, \ldots w \times h$ corresponding to the pixels in the scene depicted in the first image. The system can generate the initial 3D point cloud using a pinhole camera model. Let $(x^i_t, y^i_t)$ be the column and row positions of the pixel in the first image $I_t$ and let $(c_x, c_y, f)$ be the camera intrinsics (i.e. $c_x$, $c_y$ are principle point offset in x and y directions, f is the focal length of a pinhole of camera model), then the system determines $X^i_t$ as follows:

$$X^i_t = \begin{bmatrix} X^i_t \\ Y^i_t \\ Z^i_t \end{bmatrix} = \frac{d^i_t}{f} \begin{bmatrix} \frac{x^i_t}{w} - c_x \\ \frac{y^i_t}{h} - c_y \\ f \end{bmatrix},$$

where $d^i_t$ denotes the depth value of the $i^{th}$ pixel. The system can use the camera intrinsics when available. Otherwise, the system can revert the intrinsics values to predetermined values. For example, in some cases, the system can use (0.5, 0.5, 1.0) as default intrinsics values.

The system transforms, using motion segmentation masks $m^k_t$ and the object motion output $\{R^k_t, t^k_t\}$, the initial 3D point cloud to generate an initial transformed 3D point cloud (step 504).

In particular, the system applies object transformations on the initial 3D cloud point $X^i_t$ to obtain the initial transformed point cloud $X'^i_t$ as follows:

$$X'_t = X_t + \sum_{k=1}^{K} m^k_t(i)(R^k_t(X_t - p_k) + t^k_t - X_t).$$

where $\{R^k_t, t^k_t\}$, $k \in \{1, \ldots, K\}$ denote the 3D rotation and translation of the K moving object classes in the scene depicted at each pixel, and where $P_k$ indicates the center coordinates of object classes k.

The system then transforms, using the camera motion output $\{R^c_t, t^c_t\}$, the initial transformed 3D point cloud to generate a final transformed 3D point cloud (step 506).

In particular, the system applies camera transformations on the initial transformed point cloud $X_t'$ to generate the final transformed 3D point cloud $X_t''$ as follows:

$$X_t''=R_t^c(X_t'-p_t^c)+t_t^c.$$

The system determines the optical flow output by projecting the final transformed 3D point cloud to a two-dimensional representation of the scene in the second image (step 508).

In particular, the system obtains the row and column position of the pixel in the second image $(x_{t+1}^i, y_{t+1}^i)$ following the first image by projecting the final transformed 3D point cloud $X_t''=(X_t'', Y_t'', Z_t'')$ to the image plan as follows:

$$\begin{bmatrix} \frac{x_{t+1}^i}{w} \\ \frac{y_{t+1}^i}{h} \end{bmatrix} = \frac{f}{Z_t''} \begin{bmatrix} X_t'' \\ Y_t'' \\ f \end{bmatrix} + \begin{bmatrix} c_x \\ c_y \end{bmatrix}.$$

The system determines the optical flow output between the first image and the second image at pixel i as follows:

$$(U_t(i), V_t(i)) = (x_{t+1}^i - X_t^i, y_{t+1}^i - y_t^i).$$

where $(U_t(i),V_t(i))$ is a vector representing an optical flow from pixel i in the first image to the pixel i in the second image.

To effectively generate the optical flow, neural networks in the neural network system (e.g., the neural network system 100 of FIG. 1 or the neural network system 200 of FIG. 2) can be trained jointly using different training techniques.

The systems can be trained with various degrees of supervision. In some cases, the systems can be trained in an unsupervised manner. For example, given unconstrained video, without accompanying ground-truth structure or motion information, the system can be trained to minimize the photometric error between the first frame and the second frame warped towards the first frame according to the predicted optical flow, based on brightness constancy assumptions:

$$\mathcal{L}_t^{color} = \frac{1}{wh} \sum_{x,y} \|I_t(x,y) - I_{t+1}(x',y')\|_1,$$

where $x'=x+U_t(x,y)$ and $y'=y+V_t(x,y)$. In some implementations, differentiable image warping can be used and color constancy loss can be computed in a fully differentiable manner. For example, the fully differentiable operation can be performed when the systems are trained using backpropagation or gradient descent. The fully differentiable operation is helpful as it allows the training to attribute an error generated by the systems to specific weights in the neural networks. Adjusting these specific weights can lead to a reduction in the color constancy loss on the corresponding training example.

As the systems can be trained in an unsupervised manner, the system do not need to generate labeled datasets for supervised training. Therefore, the systems can use less of their storage capacity, reducing system complexity and shortening the processing time while achieving the same or better results compared to existing systems.

In some other cases, the systems can be supervised during the training by one or more of camera motion (ego-motion), depth, or ground-truth optical flow.

As an example, if ground-truth depth is available as part of the training input, depth supervision can be used in the form of robust depth regression:

$$\mathcal{L}_t^{depth} = \frac{1}{wh} \sum_{x,y} dmask_t^{GT}(x,y) \cdot \|d_t(x,y) - d_t^{GT}(x,y)\|_1,$$

where $dmask_t^{GT}$ if, denotes a binary image that signals presence of ground-truth depth.

In another example, if ground-truth camera pose trajectories are available in the training input, the system can be trained in a supervised manner by computing corresponding ground-truth camera rotation and translation from $R_t^{c-GT}, t_t^{c-GT}$ from frame to frame, and constrain the camera motion predictions accordingly. Specifically, the training computes the relative transformation between predicted and ground-truth camera motion $\{t_t^{err}+inv(R_t^c)(t_t^{c-GT}-t_t^c), R_t^{err}=inv(R_t^c)(R_t^{c-GT})\}$ and minimize its rotation angle and translation norm:

$$\mathcal{L}_t^{ctrans} = \|t_t^{err}\|_2$$

$$\mathcal{L}_t^{crot} = \arccos\left(\min\left(1, \max\left(-1, \frac{trace(R_t^{err})-1}{2}\right)\right)\right)$$

In yet another example, if ground-truth optical flow, object masks, or object motions are available in the training input, the system can be trained to minimize, for example, an L1 regression loss between predicted $\{U(x,y), V(x,y)\}$ and ground-truth $\{U^{GT}(x,y), V^{GT}(x,y)\}$ flow vectors.

To improve output consistency, different components (e.g., neural networks) in the system can be trained jointly by using one training objective function. The systems can be trained using conventional training techniques, for example, gradient descent methods.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A system comprising one or more computers and one or more storage devices storing instructions that, when executed by the one or more computers, cause the one or more computers to implement:
 a motion neural network configured to:
  receive a first image and a second image, and
  process the first image and the second image to generate (i) a motion output characterizing motion between the first image and the second image, and (ii) a motion segmentation mask output; and
 a scene structure neural network configured to:
  receive the first image, and
  process the first image to generate a depth map characterizing, for each of the plurality of pixels in the first image, a depth of the scene at the pixel; and
 a subsystem configured to generate, from the depth map, the motion output, and the motion segmentation mask output, an optical flow output that characterizes motion of pixels in the first image from the first image to the second image.

2. The system of claim 1, wherein the motion neural network includes a motion-mask encoder subnetwork configured to process the first image and the second image to generate a first encoded representation of the first image and the second image.

3. The system of claim 2, wherein the motion-mask encoder subnetwork is a convolutional neural network.

4. The system of claim 2, wherein the motion neural network includes a mask decoder subnetwork configured to process the first encoded representation of the first image and the second image to generate the motion segmentation mask output.

5. The system of claim 1, wherein the motion segmentation mask output comprises a respective segmentation mask corresponding to each of a plurality of object classes, each segmentation mask specifying, for each of the plurality of pixels in the first image, a likelihood that the scene at the pixel shows an object belonging to the corresponding object class.

6. The system of claim 4, wherein the mask decoder subnetwork includes deconvolutional neural network layers.

7. The system of claim 6, wherein the mask decoder subnetwork further includes a 1×1 convolutional neural network layer and one or more sigmoid activation layers.

8. The system of claim 2, wherein the motion neural network includes a motion decoder subnetwork configured to process the first encoded representation of the first image and the second image to generate the motion output.

9. The system of claim 1, wherein the motion output comprises (i) a first output defining motion of a camera from the first image to the second image and (ii) a second output defining motion of any objects belonging to the plurality of object classes from the first image to the second image.

10. The system of claim 9, wherein the first output defining motion of the camera comprises values defining rotation and translation of the camera from the first image to the second image.

11. The system of claim 10, wherein the second output defining motion of any objects belonging to the plurality of object classes, comprises, for each of the object classes, values defining rotation and translation of any objects belonging to the object class from the first image to the second image.

12. The system of claim 11, wherein the motion decoder subnetwork comprises:
 one or more fully connected neural network layers configured to process the first encoded representation to (i) generate, for each object class, the values defining rotation and translation of any objects belonging to the object class from the first image to the second image, and (ii) generate the values defining rotation and translation of the camera from the first image to the second image.

13. The system of claim 1, wherein the scene structure neural network comprises a scene structure encoder subnetwork configured to process the first image to generate a second encoded representation of the first image.

14. The system of claim 13, wherein the scene structure encoder subnetwork is a convolutional neural network.

15. The system of claim 13, wherein the scene structure neural network comprises a scene structure decoder subnetwork configured to process the second encoded representation of the first image to generate the depth map.

16. The system of claim 15, wherein the scene structure decoder subnetwork includes one or more deconvolutional neural network layers.

17. The system of claim 16, wherein the scene structure decoder subnetwork further includes a 1×1 convolutional neural network layer and one or more RELU activation layers.

18. The system of claim 9, wherein generating the optical flow output comprises:
 generating, from the depth map, an initial three-dimensional (3D) point cloud representation of the scene depicted in the first image;

transforming, using the motion segmentation mask output and the second output defining motion of objects, the initial 3D point cloud to generate an initial transformed 3D point cloud;

transforming, using the first output defining camera motion, the initial transformed 3D point cloud to generate a final transformed 3D point cloud; and determining the optical flow output by projecting the final transformed 3D point cloud to a two-dimensional representation of the scene in the second image.

19. The system of claim 1, wherein the motion neural network and the scene structure neural network have been trained jointly.

20. The system of claim 19, wherein the motion neural network and the scene structure neural network have been trained to generate depths that are consistent through estimated scene motion.

21. The system of claim 19, wherein the neural networks have been trained in an unsupervised manner.

22. The system of claim 19, wherein the neural networks have been supervised during the training by one or more of: ego-motion, depth, or ground-truth optical flow.

* * * * *